United States Patent Office 3,058,212
Patented Oct. 16, 1962

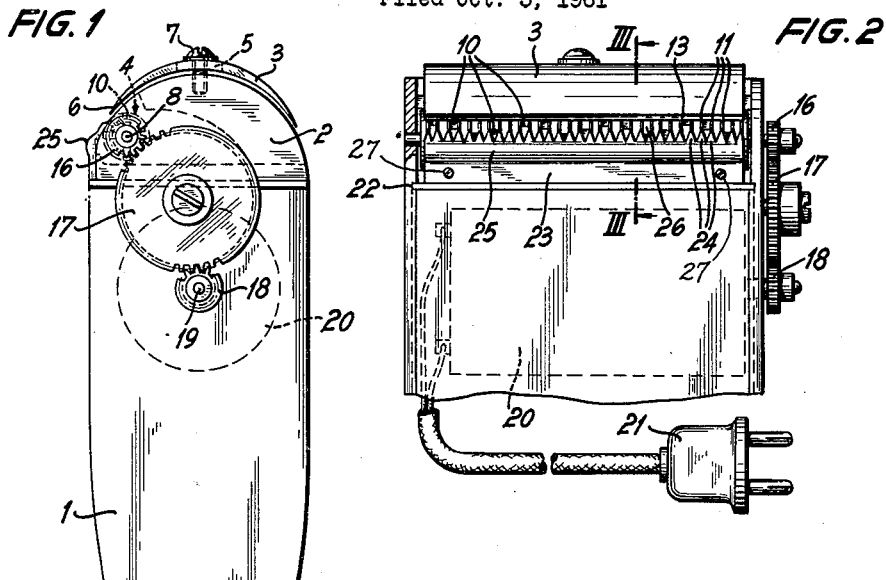
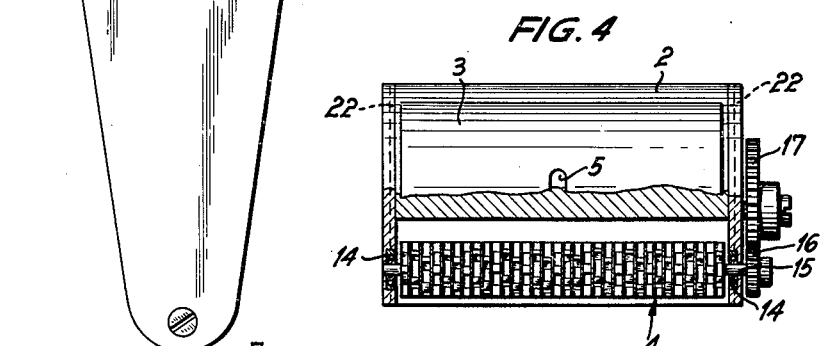
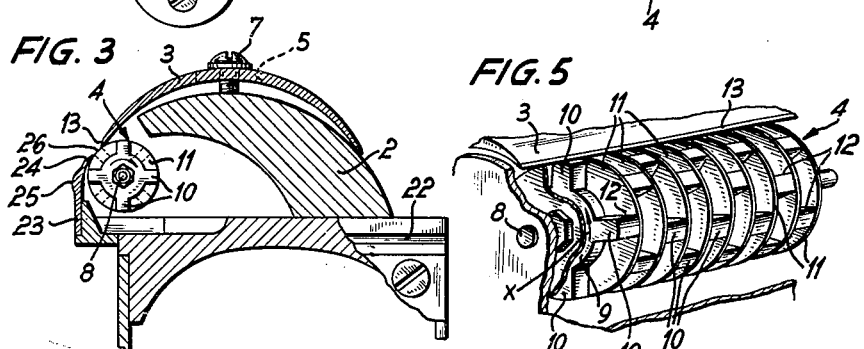

3,058,212
DRY SHAVER DEVICE WITH SPATIALLY SEPARATED CUTTER TEETH
Ferdinand Holzmann, Neue Rabenstrasse, Hamburg, Germany
Filed Oct. 3, 1961, Ser. No. 142,577
Claims priority, application Germany Oct. 6, 1960
5 Claims. (Cl. 30—34)

This invention relates to a dry shaver device, with a stationary shaver blade and co-operating cutters which are arranged as a roller rotating against the cutter blade. The invention is concerned, in particular, with dry shaver devices of this kind, in which the co-operating cutters are formed from a plurality of teeth arranged in rows, which are mutually staggered in the circumferential direction, and are disposed in a grid structure.

In known dry shavers of this kind, the co-operating cutters, which are arranged as a roller, form a unitary structure extending throughout the length of the roller, on which structure the separate blades are located. In known devices, two such continuous cutter bars are usually provided, which are mutually superposed. The co-operating cutter bars on the roller are disposed so that they describe a helical line, so that their whole cutting faces never slide at the same time under the cutting faces of the stationary shaver blade, but only in succession during travel of the helical line. A sheer cutting action is thus given, which has the disadvantage that individual hairs slide away laterally and cannot become cut off. With an unprotected frontal or shear-like cutting action by means of co-operation between the cutting edges of the stationary shaver blade and the rotating cutter, the possibility of parts of the skin becoming nipped has also proved disadvantageous.

In order to avoid these disadvantages, the helical form of the cutter bars has been provided with gaps in the direction of rotation of the cutter roller, by which the cutter is divided into several small staggered teeth. These run in a grid structure in the casing of the device, on which the stationary shaver blade is disposed. Lateral sliding of the hairs in shaving is thus prevented. These gaps in the cutter reduce its effective cutting width, however, and increase the ineffective width of the gaps.

With this known arrangement of rotation of the cutter teeth in a grid structure in the casing, it has been found that hairs can become jammed between the teeth and the grid. This produces an undesirable pulling during shaving.

These defects are avoided by the invention, in that the co-operating cutter consists, in known manner, of separate teeth arranged in rows, mutually staggered in the circumferential direction, and the grid structure is formed by annular discs, which are laterally secured to the teeth and spatially separate the teeth from one another. In this way, each separate tooth is effective in cutting over its whole width, since each separate cutter is spatially independent. The discs between the teeth can be made so thin that there is virtually no reduction of the effective cutting width, in practice. Jamming of hairs is not possible, since the separate discs serving as the grid do not rotate relatively to, but with the teeth.

In an embodiment of the invention, a working slot left by the part of the cutter roller revealed by the cutter head, opposite the cutting edges of the stationary blade, is covered by a protector blade. By means of this safety measure, injury to the skin can no longer occur in practice, since there is no place in the cutting width in which the possibility of nipping a fold in the skin can arise. For cleaning purposes, the protector blade is preferably made detachable.

A further improvement is achieved by the invention, in that the protector blade is toothed and the tips of the teeth are directed toward the annular discs. This tooth formation further improves the shaving action, in that the teeth cause hairs which are in the vicinity of the discs to be guided towards the gaps in the teeth. By the toothed formation of the edge of the protector blade, it also becomes possible to dispose the protector blade very close to the cutting edges of the stationary blade, since there is always sufficient working space left between the teeth, i.e. in the tooth gaps.

The cutting action is further improved, according to a preferred feature of the invention, by an outwardly-curving shoulder part running along the toothed edge at a distance from the protector blade.

An embodiment of the invention is described below, by way of example, in conjunction with the accompanying drawing, in which:

FIG. 1 shows the shaver device of the invention in side view;

FIG. 2 shows a front elevational view of the shaver of FIG. 1, the lower part being broken away;

FIG. 3 shows a cross-section through the cutting head on the line A—B of FIG. 2;

FIG. 4 shows the cutting head partly in longitudinal section and partly in plan view;

FIG. 5 shows a perspective view of the cutting roller.

The shaver consists of a handle part 1 and a cutting head 2. A shaver blade 3 and a co-operating cutting roller 4 are disposed on the head 2. The shaver blade 3 includes an elongated slot 5, which permits adjustment of the blade cutter, shown at 6, relative to the cutting roller 4. For this purpose, it is merely necessary for the screw 7 to be loosened, whereupon the blade 3 can be adjusted to the desired position. The screw 7 is then retightened.

The cutting roller 4 consists of a spindle 8, toothed cross-shaped members 9 carrying four individual teeth 10 and annular discs 11 made as thin as possible. All these parts are rigidly secured together. The teeth 10 have cutting edges 12, which on rotation of the roller 4 in the direction of the arrow $x$ (FIG. 5) are moved closely beneath the cutting edge 13 of the stationary blade 3. The annular discs 11 separate the teeth 10 of a cross-shaped member 9 from the teeth of the adjacent cross-shaped members. In this way, all the teeth are disposed separately in space and so are not hindered by adjacent teeth. The teeth 10 of any longitudinal row are staggered in the circumferential direction, as shown best in FIG. 5. The teeth 10 of any one cross-shaped member 9 lie opposite the tooth gaps of the adjacent cross-shaped members.

The cutting roller 4 is mounted in the cutting head 2 on ball-bearings 14. A gearwheel 16 is disposed on one journal 15 of the roller 4 and meshes with a gear-wheel 17. The latter is mounted on the handle 1. A gearwheel 18 meshes with the gearwheel 17 and is mounted on the shaft 19 of a small motor 20.

The stationary shaver blade 3 has its cutter 13 resting on the annular discs 11. The cutter device is formed by the cutter 13 and the cutting edges 12 of the individual teeth 10.

The motor 20 is provided with a connector plug 21, by which the device can be connected to a mains outlet socket.

The head 2 of the shaver can be shifted in grooves 22 in the handle 1. It can be entirely removed, in order to be more readily cleaned. The handle 1 can have any convenient shape and consist of any appropriate material, e.g. plastics material or metal.

A protector blade 23, having small teeth or serrations 24, is disposed somewhat beneath the effective cutting edge 13 of the stationary blade 3. The tips of the serrations 24 point towards the annular discs 11 of the roller 4. A rounded shoulder part 25 is provided along and spaced from the serrations upon the protector blade 23 and serves to stretch the skin immediately before cutting of the hairs of the beard during shaving. The protector blade is detachably secured to the cutting head 2 by screws 27. It can be readily detached, however, for the purposes of cleaning or replacement by unscrewing the screws 27.

As can be seen best from FIG. 3, a working gap 26 in the part of the cutter roller 4 revealed by the cutting head 2 opposite the cutting edge 13 of the stationary blade 3 is covered by a protector blade 23.

The rotating cutting roller 4 takes hold of the beard hairs with the aid of the separate cutter teeth 10, forces them rapidly against the edge 13 of the blade 3 and so effects direct shearing of them from the skin. Satisfactory shaving is thus achieved without the use of soap and water.

An even more facile shaving effect is achieved, if the cutter is arranged, in known manner, to undergo simultaneous vibration.

In the embodiment illustrated, the co-operating cutter 12 is shown with rotating teeth 10. The invention is not limited to this rotary arrangement of the cutter 12. It can have a rectilinear movement with the same effect.

I claim:

1. A dry shaver device, which includes a stationary shaver blade and a co-operating cutter arranged as a roller rotating relative to the edge of the blade, the cutter comprising a plurality of teeth which are arranged in rows and mutually staggered in the circumferential direction and which are located in a grid structure, in which the grid structure is formed by annular discs concentric with the axis of revolution and rotating with the cutter, which are laterally secured to the cutter teeth and spatially separate such teeth.

2. A shaver device according to claim 1, in which a working gap in the part of the cutter roller revealed by the cutting head opposite the cutting edge of the stationary blade is covered by a protector blade.

3. A shaver device according to claim 2, in which the protector blade is detachable.

4. A shaver device according to claim 2, in which the protector blade is serrated and the tips of the serrations are directed toward the annular discs.

5. A shaver device according to claim 4, in which an outwardly-curved shoulder part runs along and is spaced from the serrations of the protector blade.

References Cited in the file of this patent

UNITED STATES PATENTS

| | | |
|---|---|---|
| 1,565,680 | Silverwood | Dec. 15, 1925 |
| 2,186,092 | Benner | Jan. 9, 1940 |
| 2,423,595 | Hall | July 8, 1947 |

FOREIGN PATENTS

| | | |
|---|---|---|
| 831,803 | France | Sept. 15, 1938 |
| 806,115 | Great Britain | Dec. 17, 1958 |